Aug. 12, 1941.  H. W. PRICE ET AL  2,252,273

TRANSMISSION CONTROL MECHANISM

Filed Feb. 9, 1939

INVENTOR.
HAROLD W. PRICE
EARL R. PRICE
BY H. O. Clayton
ATTORNEY.

Patented Aug. 12, 1941

2,252,273

UNITED STATES PATENT OFFICE 2,252,273

TRANSMISSION CONTROL MECHANISM

Harold W. Price and Earl R. Price, South Bend, Ind.

Application February 9, 1939, Serial No. 255,379

1 Claim. (Cl. 74—473)

This invention relates in general to transmission operating means and in particular to means for operating the conventional three-speeds forward and reverse transmission of an automotive vehicle.

It is desirable, in the modern automotive vehicle, to clear the driver's compartment of all unnecessary controls, such, for example, as the relatively long transmission operating shift lever protruding from the floor. Accordingly, one of the principal objects of the invention is to provide a simple and compact shift rail selecting and actuating mechanism mounted within the cover plate of the transmission and provided with relatively short cranks extending outside the cover plate and actuated by force transmitting means, including a manually operable selector located in the driver's compartment.

It is the principal object of the invention, however, to provide a mechanism of few moving parts which may be secured to the casing of the transmission and immediately adjacent the parallel shift rails, said mechanism including a member bodily movable laterally of the rails to effect the selection of a rail to be actuated, and further including means for imparting an angular movement to said member to thereby move the selected rail and place the transmission in gear.

Other objects of the invention and desirable details of construction and combinations of parts will become apparent from the following description of a preferred embodiment, which description is taken in conjunction with the accompanying drawing, in which.

Figure 2:
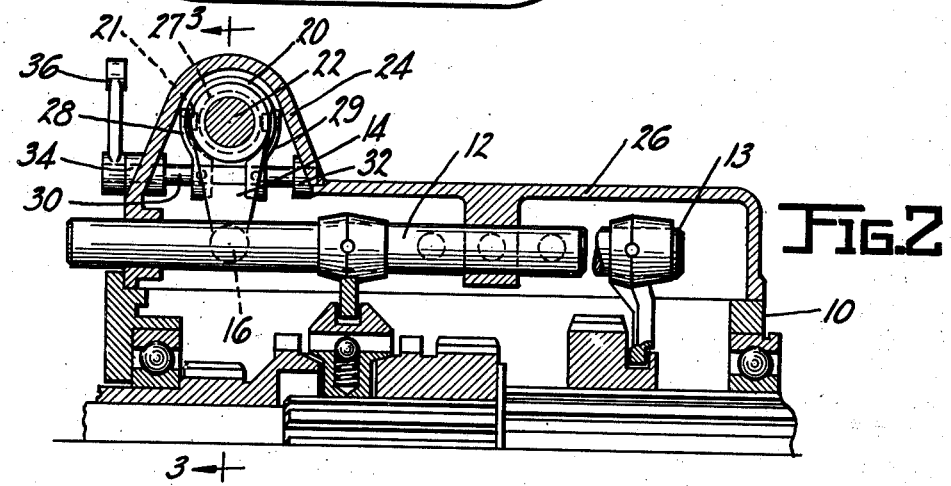
Figure 2 is a view disclosing, in section, part of a standard three-speeds forward and reverse transmission and the transmission operating means constituting our invention.

Referring now to Figure 2, disclosing a preferred embodiment of our invention, there is disclosed a portion of a standard three-speeds forward and reverse transmission 10 of conventional design. The first and reverse gear shift rail 13 of the transmission and its juxtaposed high and second gear shift rail 12 are selectively operated by a member 14 provided with a cylindrically-shaped end member 16, adapted to fit within the oppositely disposed slots 18 in the rails. The member 14 extends from a bodily movable tubular member 20 non-rotatably but slidably mounted upon the shift rail operating shaft 22 rotatably mounted in a projection 24 in the cover plate or transmission casing 26. The tubular member 20 together with the member 14 constitute what may be termed a selector member. The member 20 is provided with a recessed portion 27 into which trunnion pins 21 of yoke members 28 and 29 fit, the latter being secured at their lower ends to a pin 30 journaled at 32 and 34 in the casing 26 and protruding from the outer face of the casing of the transmission. Upon rotating the pin 30 by means of a crank 36 located outside the transmission casing, the rotatable yokes 28 and 29 serve to slide the selected member on the shaft 22 to nest the ball-shaped end member 16 into engagement with one or the other of the slots 18 in the shift rails. Accordingly, the pin 30 serves both as a mounting for the yokes 28 and 29 and as a force-transmitting member to make possible the angular movement of the yokes, either clockwise or counterclockwise, when the crank 36 is rotated. The crank 36, pin 30 and yokes 28 and 29 together constitute a lever member. A crank 37 is secured to an end of the pin 22, also protruding from the outer face of the transmission casing. This so-called cross-shift operation effects a selection of one or the other of the shift rails prior to moving the selected rail to mesh the gears.

Figure 1:
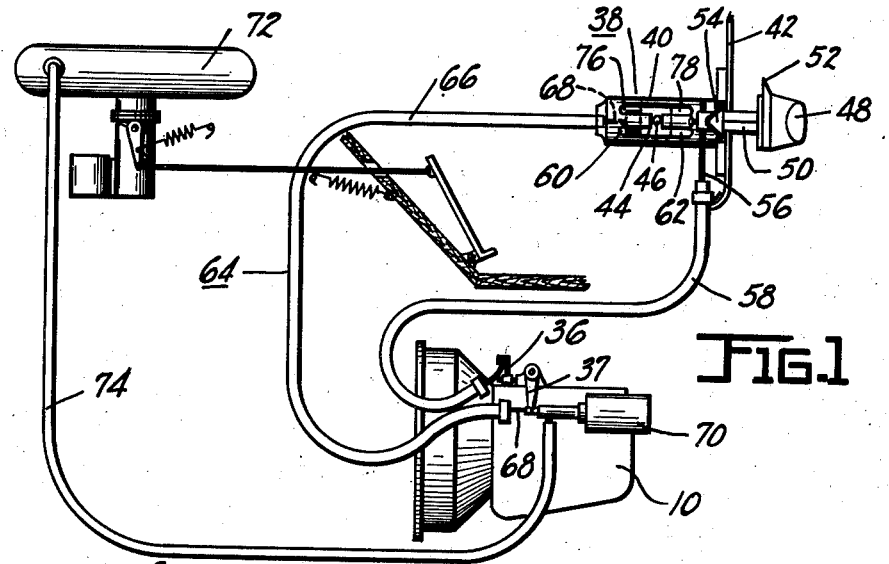
Figure 1 is a diagrammatic view of a transmission operating mechanism for actuating the mechanism within the casing of the transmission, said mechanism constituting our invention.
Figure 3:
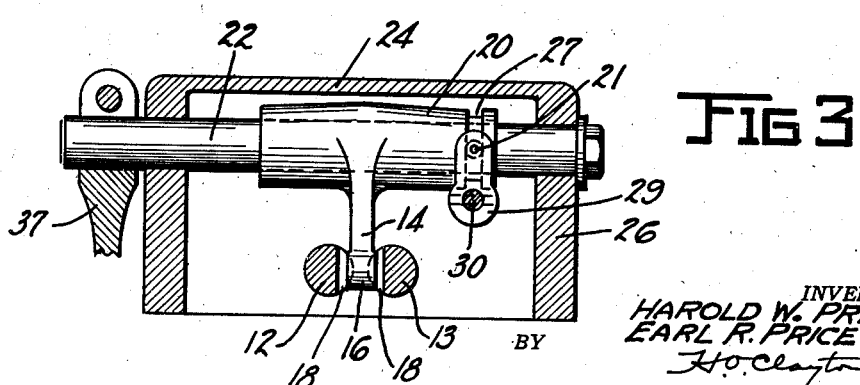
Figure 3 is another sectional view of the shift rail selecting and actuating mechanism constituting our invention, said view being taken on the line 3—3 of Figure 2.

As disclosed in Figure 1, there is provided a selector unit 38, comprising a tubular housing member 40 adjustably secured to the engine side of the dashboard 42. From a tubular plunger 44, slidably mounted within the member 40, there projects a pin 46 adapted to fit within an H-shaped slot in said member. The plunger 44 is rotated by means of a hand operated knob 48 secured to the plunger by means of a rectangular-shaped pin 50. Upon rotating the knob counterclockwise so that a pointer 52 thereon is moved to a first and reverse gear position, a crank 54 secured to the pin 50 serves to move a cable 56 of a Bowden control 58. The crank 36 is thus moved counterclockwise to bodily move or slide the member 20 to the right, Figure 3, thereby moving the crank 14 to next the end member 16 in the slot 18 within the first and reverse gear shift rail 13. It follows that clockwise rotation of the knob 48 serves to slide the member 20 to the left, Figure 3, and to nest the member 16 in the second and high gear shift rail 12 preparatory to establishing the transmission either in second or high gear.

Describing now the mechanism for effecting an angular movement of the selector member 14 to move the selected rail and place the gears in mesh, the knob 48 is either pushed in or pulled out to slide the pin 46 within one or the other of channels 60 and 62 of the H slot in the member 40. Describing the operation of placing the transmission in low gear, movement of the knob toward the driver serves, through the intermediary of a Bowden control 64 comprising a conduit 66 and a cable 68, to actuate a follow-up control valve located within the casing of a double-actuating pressure differential operated motor 70. With operation of the valve, the motor is energized and the crank 37 is actuated to rotate the selector member 14 clockwise. The low and reverse shift rail 13 is thus moved to the left, Figure 2, and the transmission is placed in low gear.

The motor 7 is preferably vacuum operated, being connnected to the intake manifold 72 by a conduit 74. The motor 70, its follow-up control valve and the connections interconnecting the piston of the motor, the valve, the selector unit 38 and the crank 37 are not disclosed in detail in this application, inasmuch as the invention herein presented is limited to the shift rail selecting and operating means secured to the casing of the transmission. However, this mechanism is disclosed in detail in our Patent No. 2,152,914, dated April 4, 1939, of which this application constitutes a division.

Pushing the knob toward the dash serves to establish the transmission in reverse gear, assuming that the knob has been rotated counterclockwise. In this operation, the cable 68 is placed in compression to again operate the valve within the motor 70 and to again energize the latter to move the crank 37 counterclockwise. The shift rail 13 is thus moved to the right to place the transmission in reverse gear.

It will be obvious that the above-described operation of the motor will be duplicated in placing the transmission either in second or high gear, when the knob 48 is rotated clockwise to place the pin 46 in one or the other of channels 76 and 78 and then is either pushed toward the dashboard or pulled toward the driver. In this operation, the end 16 of the selector member 14 is moved into registry with the second and high gear shift rail 12, this being followed by an angular movement of said member to place the transmission in gear.

There is thus provided a dash-mounted manually operable selector for first selecting the gear shift rail of the transmission to be operated and then effecting a movement of the rail to establish the gear setting.

Our invention is, however, directed solely to the means, consisting of the cranks 36 and 37 and the mechanism mounted within the projection 24 of the transmission casing, for first selecting a shifter bar to be actuated and then moving the selected bar to establish the transmission in the desired gear ratio. As hereinbefore stated, this part of the transmission operating means, with its relatively short cranks 36 and 37, cooperates well with a manually operated selector mounted within the driver's compartment, said selector and the force transmitting means secured thereto serving first to actuate the crank 36 for effecting a selection of the rail to be actuated and then serving to operate a valve for controlling the operation of the power means, which actuates the crank 37 to complete the operation of the transmission.

While one illustrative embodiment has been described, it is not our intention to limit the scope of the invention to that particular embodiment, or otherwise than by the terms of the appended claim.

We claim:

In combination with a pair of shift rails for actuating a mechanism to establish four different gear ratios in a transmission, of means for selecting one or the other of said rails to be moved and then bodily moving the selected rail either forwardly or backwardly to establish the transmission in gear, said means comprising a shift rail operating shaft, a circumferentially grooved selector member mounted on said shaft and movable in one manner to bring a portion of said selector member into contact with one or the other of said shift rails and in another manner to effect a movement of the selected shift rail, lever means cooperating with said selector member comprising a rotatable shaft journaled in opposite sides of the casing of the transmission and having the greater part of its length extending into the casing and a lesser part extending outside the casing, a crank connected to said last named part, a pair of lever arms connected with said first named part within the casing, pins formed on said arms and operable within the groove of said selector member for moving the latter upon movement of said crank, and a crank secured to the shift rail operating shaft and serving when rotated to rotate said shaft to establish the transmission in gear.

HAROLD W. PRICE.
EARL R. PRICE.